(12) United States Patent
Park

(10) Patent No.: US 11,999,327 B2
(45) Date of Patent: Jun. 4, 2024

(54) ELECTRONIC BRAKE DEVICE OF VEHICLE

(71) Applicant: HYUNDAI MOBIS CO., LTD., Seoul (KR)

(72) Inventor: Si Yoon Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/981,284

(22) Filed: Nov. 4, 2022

(65) Prior Publication Data

US 2023/0311838 A1    Oct. 5, 2023

(30) Foreign Application Priority Data

Apr. 5, 2022    (KR) .................. 10-2022-0042543

(51) Int. Cl.
*B60T 13/74*    (2006.01)
(52) U.S. Cl.
CPC .................. *B60T 13/745* (2013.01)
(58) Field of Classification Search
CPC .............................. B60T 13/746; B60T 13/745
See application file for complete search history.

(56) References Cited

U.S. PATENT DOCUMENTS 10,919,510 B2 * 2/2021 Alili ...................... B60T 13/745
2022/0169225 A1 * 6/2022 Hong ...................... B60T 8/368

FOREIGN PATENT DOCUMENTS

| JP | 2004-210165 A | 7/2004 |
| KR | 10-2014-0081417 A | 7/2014 |
| KR | 10-2019-0037942 A | 4/2019 |
| KR | 10-2020-0066704 A | 6/2020 |

OTHER PUBLICATIONS

Office Action issued on Aug. 21, 2023 in the corresponding Korean Patent Application No. 10-2022-0042543.

* cited by examiner

*Primary Examiner* — Kenneth Bomberg
*Assistant Examiner* — Daniel S Collins
(74) *Attorney, Agent, or Firm* — NovoTechIP International PLLC

(57) ABSTRACT

Proposed is an electronic brake device of a vehicle including: a cylinder unit; a screw shaft provided in the cylinder unit, and axis-rotated by a rotational force received from a motor; a nut unit coupled to the screw shaft with a ball member interposed therebetween, reciprocates in an axial direction of the screw shaft according to a rotating direction of the screw shaft, and provided with a flange part on one side end portion thereof; a piston unit coupled to the nut unit, and moves in conjunction with the nut unit; a sleeve unit provided inside the cylinder unit, and guides the piston unit to be inserted and move therethrough; and a guide member provided inside the cylinder unit, restricts rotation of the flange part so that rotation of the nut unit is restricted, and guides movement of the flange part.

10 Claims, 7 Drawing Sheets

ELECTRONIC BRAKE DEVICE OF VEHICLE

CROSS-REFERENCE TO RELATED APPLICATIONS

This application claims the benefit of priority under 35 USC § 119(a) to Korean Patent Applications No. 10-2022-0042543, filed on Apr. 5, 2022, the disclosure of which is incorporated herein by reference in its entirety.

TECHNICAL FIELD

Exemplary embodiments of the present disclosure relate to an electronic brake device of a vehicle, and more particularly, to an electronic brake device of a vehicle that converts a rotary motion of a screw, which is rotated by a rotational force received from a motor, into a linear motion of a piston.

BACKGROUND

In general, due to the characteristics of an electric brake device for a vehicle, a device is required to convert a rotary motion of an electric motor into a linear motion of a piston inside a cylinder in order for generating braking hydraulic pressure.

For a device that converts a rotary motion of an electric motor into a linear motion, a ball screw unit is applied to the electric brake device, which includes a screw shaft that is axially coupled to the electric motor and is axis-rotated by a rotational force received from the electric motor and a nut that is coupled to the screw shaft with a ball interposed therebetween and moves in an axial direction of the screw shaft.

For the linear motion of the piston which is coupled to the nut moving along the screw shaft, a member for guiding the linear motion of the nut is required so that the nut performs the linear motion while the rotation of the nut is blocked when the screw shaft rotates.

In addition, due to the characteristics of the ball screw unit which performs forward/backward rotation in response to directional changes in a rotational force generated by the electric motor to perform a reciprocating motion, coupling between the nut and the piston may be released when the directional changes for linear moving in a reciprocating direction occur. Therefore, there is a need to improve this.

The related art of the present disclosure is disclosed in Korean Patent Application Publication No. 10-2020-0066704 published on Jun. 10, 2020, and entitled "Integrated Hydraulic Module of an Electrohydraulic Servo Brake".

SUMMARY

Various embodiments are directed to an electronic brake device of a vehicle to solve the above-described problems, and objects of the present disclosure are to provide the electronic brake device of the vehicle, which is capable of converting a rotary motion of a screw rotated by a rotational force received from a motor into a linear motion of a piston.

In addition, objects of the present disclosure are to provide an electronic brake device of the vehicle, which is capable of guiding a linear motion of a nut coupled to the screw with a ball interposed therebetween.

In addition, objects of the present disclosure are to provide an electronic brake device of the vehicle, which is capable of preventing uncoupling between the mutually coupled nut and piston.

In an embodiment, to achieve the objects, there is provided an electronic brake device of a vehicle including: a cylinder unit; a screw shaft provided in the cylinder unit, and configured to be axis-rotated by a rotational force received from a motor; a nut unit coupled to the screw shaft with a ball member interposed therebetween, configured to reciprocate in an axial direction of the screw shaft according to a rotating direction of the screw shaft, and provided with a flange part on one side end portion thereof; a piston unit coupled to the nut unit, and configured to move in conjunction with the nut unit; a sleeve unit provided inside the cylinder unit, and configured to guide the piston unit to be inserted and move therethrough; and a guide member provided inside the cylinder unit, configured to restrict rotation of the flange part so that rotation of the nut unit is restricted, and configured to guide movement of the flange part.

In an embodiment, a concave groove portion formed to be recessed in a lengthwise direction of the cylinder unit, may be formed in an inner surface of the cylinder unit, and the guide member may be seated in the concave groove portion.

In an embodiment, a support portion, which supports one side end portion of the guide member, may be formed on the inner surface of the cylinder unit, and the support portion may be formed to protrude from one side end portion of the concave groove portion.

In an embodiment, the nut unit may include a guide groove portion which is formed to be recessed in an outer surface of the flange part to correspond to the concave groove portion and in which the flange part linearly moves along the guide member.

In an embodiment, the piston unit may include a rod part spirally coupled to an outer surface of the nut unit; and a head part integrally formed with the rod part, and configured to reciprocate in the sleeve unit in a lengthwise direction of the sleeve unit.

In an embodiment, the nut unit and the flange part may be integrally formed with each other.

In an embodiment, a port may be formed in an outer surface of the sleeve unit for movement of a hydraulic fluid, and a cutoff hole part may be formed in an outer surface of the sleeve unit to communicate with the port.

In an embodiment, the cylinder unit may form a double-acting hydraulic pressure due to reciprocating movement of the piston unit.

In an embodiment, a washer unit mounted between the nut unit and the piston unit may be included therein.

In an embodiment, a first thread provided on one outer side surface of the washer unit and formed in a circumferential direction of the washer unit and a second thread provided on the other outer side surface of the washer unit and formed in a circumferential direction of the washer unit may be included therein.

In an embodiment, the first thread and the second thread may be formed in a shape of a right-angled triangle with a hypotenuse inclined in a direction in which the nut unit and the rod part are coupled.

In an embodiment, with a configuration of a guide member mounted inside a cylinder unit to restrict the rotation of a nut unit that moves along a screw shaft and to guide a linear motion of the nut unit, the rotary motion of the screw shaft can be converted into the linear motion of the piston unit, thereby having effects of cost reduction and performance improvement in noise, vibration, and harshness (NVH).

In an embodiment, a flange part, of which rotation is restricted by the guide member and which performs a linear motion along the guide member, is integrally formed with the nut unit, thereby having effects of increased rigidity and reduced assembly complexity.

In an embodiment, a washer unit on which threads are formed is mounted between the nut unit and the piston unit, thereby having an effect of preventing uncoupling between the nut unit and the piston unit.

DETAILED DESCRIPTION

Figure 1:
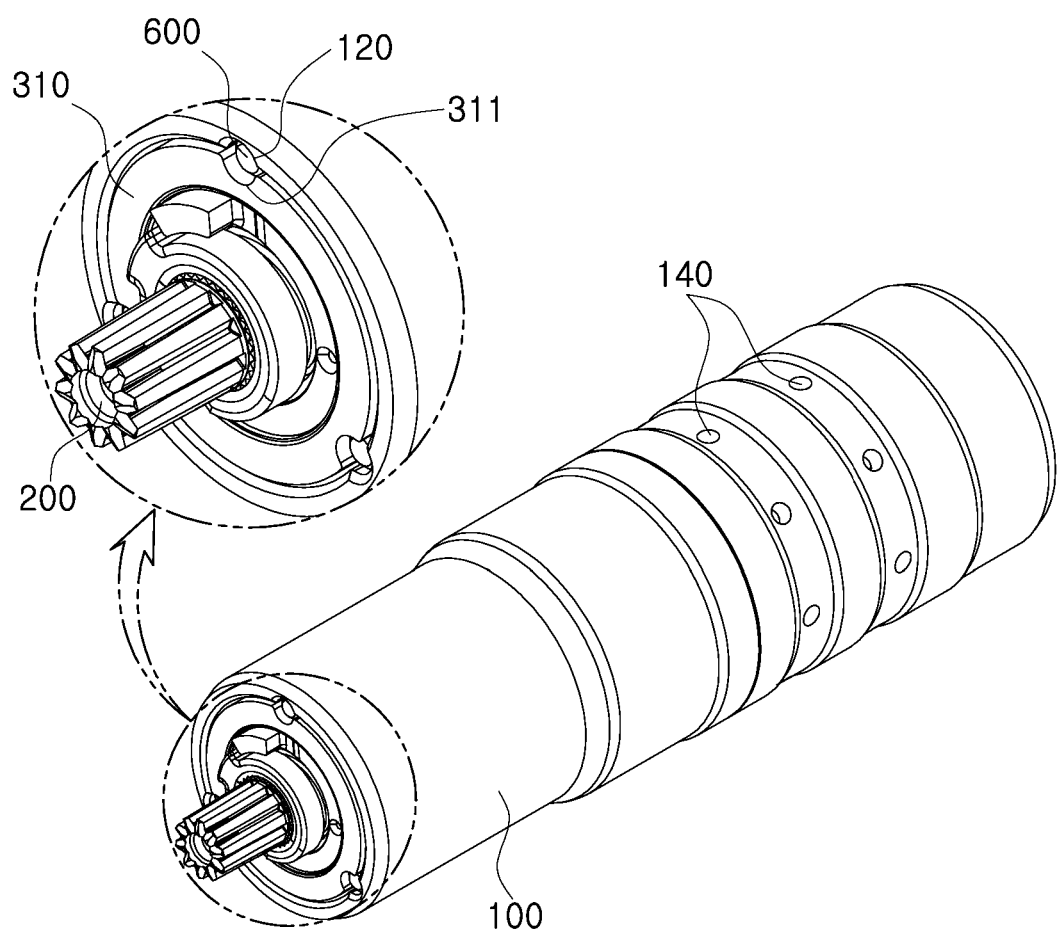
FIG. 1 is a perspective view illustrating an electronic brake device of a vehicle according to an embodiment of the present disclosure.

Hereinafter, an electronic brake device of a vehicle will be described below with reference to the accompanying drawings through various exemplary embodiments. In such a process, for clarity and convenience in description, thicknesses of lines, sizes of constituent elements, and the like may be illustrated in an exaggerated manner in the drawings. In addition, terms described below are defined by considering functions according to the present disclosure and may vary according to the intention of a user or a manager or according to the common practices in the art. Therefore, definitions of the terms should be stated in light of details disclosed throughout the present specification.

Figure 2:
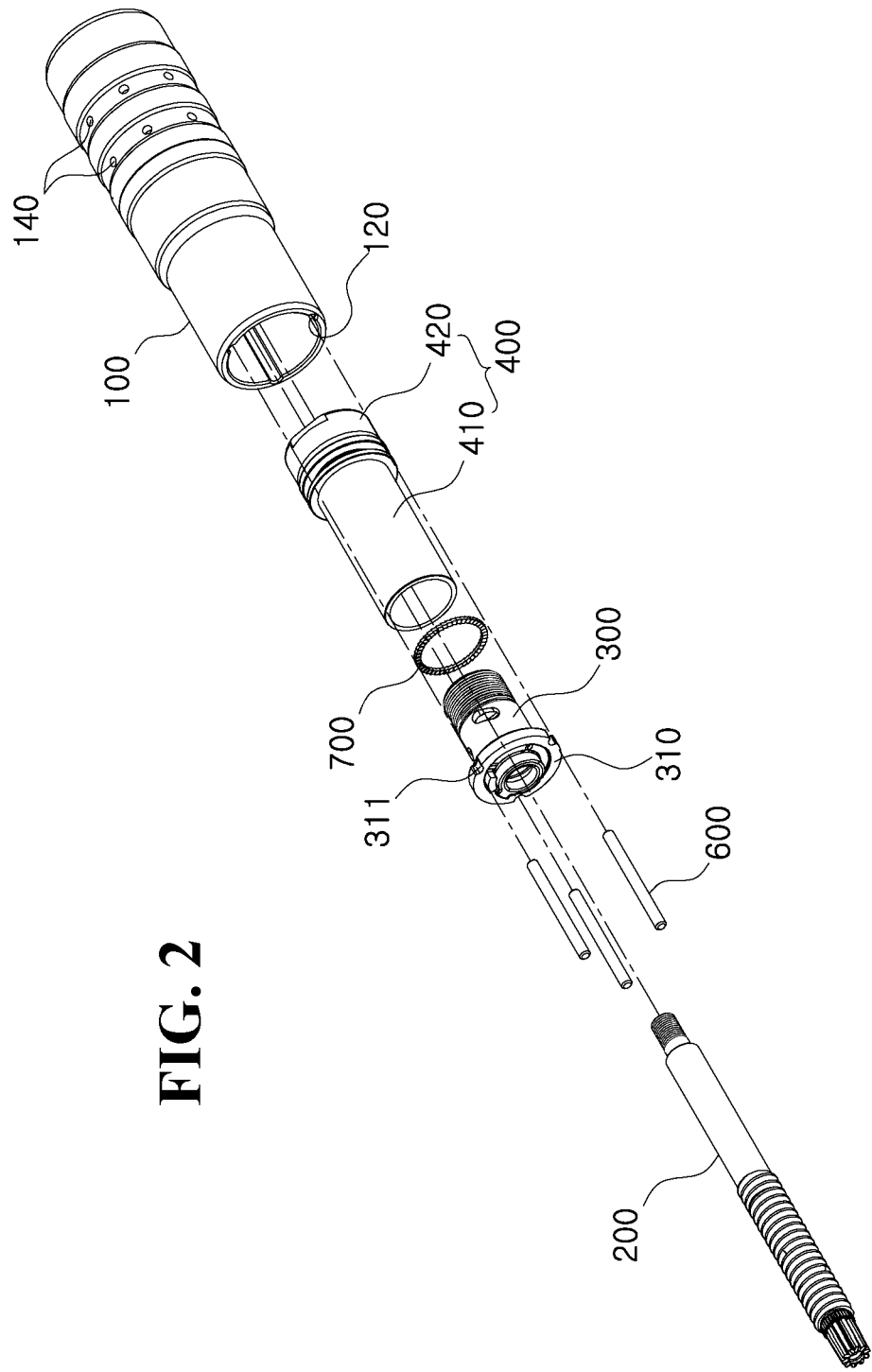
FIG. 2 is an exploded perspective view illustrating the electronic brake device of the vehicle according to the embodiment of the present disclosure.
Figure 3:
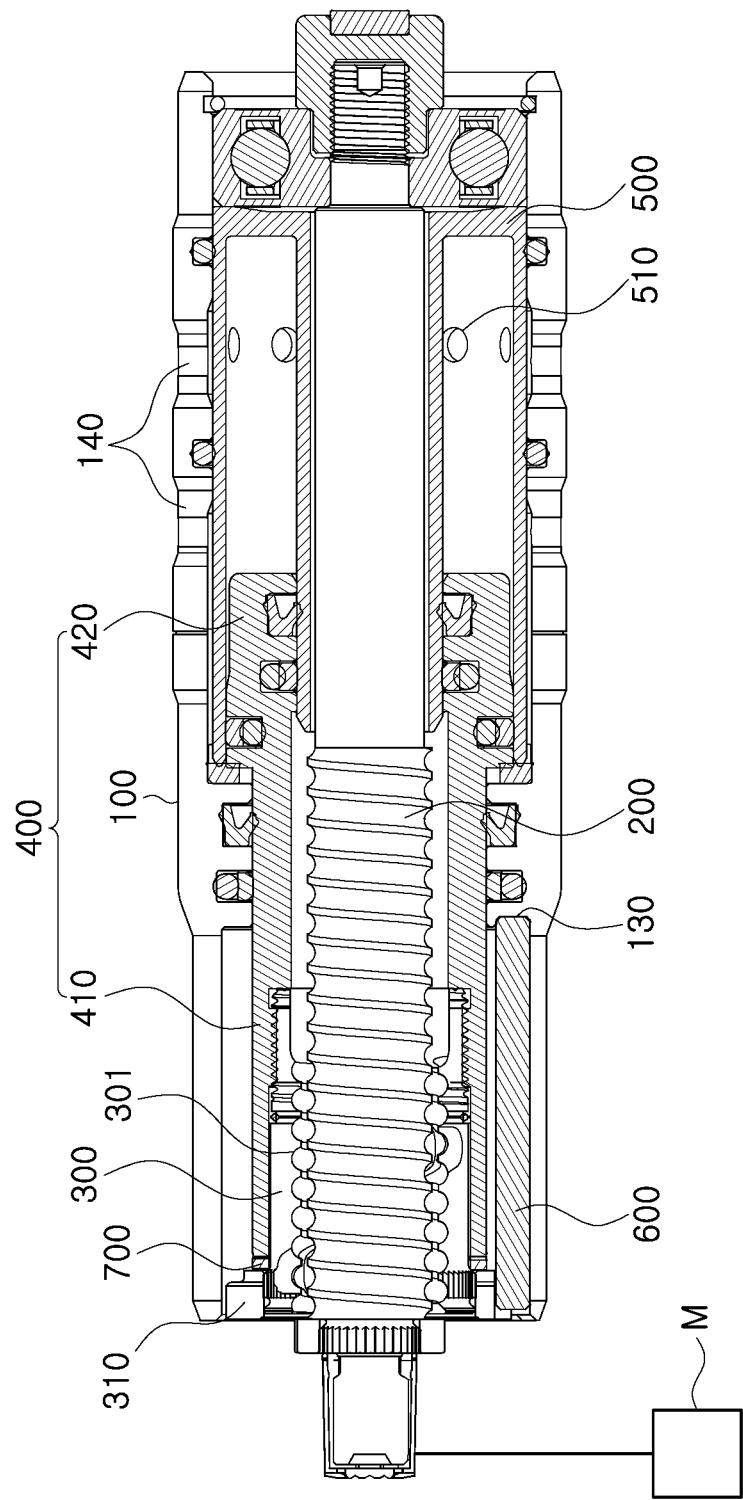
FIG. 3 is a cross-sectional view illustrating the electronic brake device of the vehicle according to the embodiment of the present disclosure.

FIG. 1 is a perspective view illustrating an electronic brake device of a vehicle according to an embodiment of the present disclosure, FIG. 2 is an exploded perspective view illustrating the electronic brake device of the vehicle according to the embodiment of the present disclosure, and FIG. 3 is a cross-sectional view illustrating the electronic brake device of the vehicle according to the embodiment of the present disclosure.

Referring to FIGS. 1 to 3, the electronic brake device of the vehicle according to the embodiment of the present disclosure includes a cylinder unit 100, a screw shaft 200, a nut unit 300, a piston unit 400, a sleeve unit 500, and a guide member 600.

The cylinder unit 100 is formed in a hollow shape. The sleeve unit 500 is disposed at or provided in one side space (a right side in FIG. 3) inside the cylinder unit 100. The sleeve unit 500 is arranged inside the cylinder unit 100 so that hydraulic pressure is formed by pressing the piston unit 400. The sleeve unit 500 guides the piston unit 400 to be inserted and move therethrough. The sleeve unit 500 is formed to surround a head part 420 of the piston unit 400.

In an outer surface of the cylinder unit 100 corresponding to the sleeve unit 500, a port 140 for movement of a hydraulic fluid is formed. The hydraulic fluid moved by the movement of the piston unit 400 moves through the port 140 and implements a required brake pressure.

A cutoff hole part 510 is formed in an outer surface of the sleeve unit 500 and connected to the port 140. The cutoff hole part 510 may be formed as a plurality of cutoff hole parts in a circumferential direction of the sleeve unit 500. Therefore, the hydraulic fluid of the sleeve unit 500 may be discharged in a radial direction of the piston unit 400.

The screw shaft 200 is disposed or provided within the cylinder unit 100. The screw shaft 200 is inserted into the cylinder unit 100 in a lengthwise direction. A central axis of the cylinder unit 100 and a central axis of the screw shaft 200 are match each other.

The screw shaft 200 is axially coupled to the cylinder unit 100, and one side end portion (the right side in FIG. 3) of the screw shaft 200 is rotatably coupled to one side end portion (the right side in FIG. 3) of the cylinder unit 100 so that the screw shaft 200 axis-rotates.

The screw shaft 200 axis-rotates in the cylinder unit 100 by a rotational force received from a motor M and may be formed in any shape within a technical idea of rotation by rotational power received from the motor M.

The other end portion of the screw shaft 200 (a left side in FIG. 3) is connected to the motor M in which any type of driving units may be utilized within a technical idea for providing the rotational power. On the other end portion of the screw shaft 200, a spline portion is formed in a circumferential direction thereof. Therefore, the other end portion of the screw shaft 200 is spline-coupled to the motor M.

On an outer surface of the screw shaft 200, a spiral gear is formed in a lengthwise direction of the screw shaft 200.

The nut unit 300 is disposed or provided within the cylinder unit 100 and is coupled to the outer surface of the screw shaft 200 with a ball member 301 interposed therebetween. The screw shaft 200 passes through and is coupled to the nut unit 300. The ball member 301 is provided between the spiral gear formed on the outer surface of the screw shaft 200 and an inner surface of the nut unit 300, and a rotary motion of the screw shaft 200 is converted into a linear motion through the nut unit 300. That is, the nut unit 300 reciprocates in an axial direction of the screw shaft 200 according to a rotating direction of the screw shaft 200.

On one side end portion (the left side in FIG. 3) of the nut unit 300 facing the motor M, a flange part 310 is formed. The flange part 310 is formed in a circumferential direction of the nut unit 300, protrudes laterally from the nut unit 300, and the flange part 310 is integrally formed with the nut unit 300.

Since the nut unit 300 and the flange part 310 are not separate from each other and the flange part 310 is integrally formed with the nut unit 300, rigidity can increase, and assembly complexity can be reduced. Meanwhile, the nut unit 300 and the flange part 310 may be formed separately and coupled to each other to form a one body.

The piston unit 400 is coupled to the nut unit 300. The piston unit 400 moves in a lengthwise direction of the cylinder unit 100 in conjunction with the nut unit 300.

The piston unit 400 includes a rod part 410 and the head part 420.

The rod part 410 is formed in a hollow shape, and an outer surface of the nut unit 300 and an inner surface of the rod part 410 are spirally coupled to each other. The head part 420 is integrally formed with the rod part 410. An external diameter of the head part 420 may be formed bigger than that of the rod part 410.

The head part 420 reciprocates in the sleeve unit 500. Therefore, the cylinder unit 100 forms a double-acting hydraulic pressure due to reciprocating movement of the piston unit 400.

The guide member 600 is disposed or provided within the cylinder unit 100. The guide member 600 may be a rod shape with a certain length and a circular or elliptical cross section and may be a bar shape with a predetermined length and an angled polygonal cross section.

The guide member 600 restricts rotation of the flange part 310 integrally formed with the nut unit 300 so that the nut unit 300, which moves along the screw shaft 200 by forward/backward rotation of the screw shaft 200, does not rotate in a rotating direction of the screw shaft 200 and guides movement of the flange part 310 to linearly move the nut unit 300 in an axial direction of the screw shaft 200.

The guide member 600 may be provided as a plurality of guide members that are arranged apart from each other in a circumferential direction of the cylinder unit 100. The guide member 600 is formed to be long with a predetermined length, and thus a stroke required for forming a braking hydraulic pressure can be secured longer compared to the same layout.

On the inner surface of the cylinder unit 100, a concave groove portion 120 in which the guide member 600 is seated is formed. The concave groove portion 120 may be formed in a recessed shape in the inner surface of the cylinder unit 100.

The concave groove portion 120 is formed to be long with a predetermined length in a lengthwise direction of the cylinder unit 100 to correspond to a length of the guide member 600. The concave groove portion 120 may be provided as a plurality concave groove portions arranged apart from each other in a circumferential direction of the cylinder unit 100.

On the inner surface of the cylinder unit 100, a support portion 130 is formed to support one side end portion (a right end portion in FIG. 3) of the guide member 600. The support portion 130 is formed on one side end portion of the concave groove portion 120. The support portion 130 may be formed to protrude from the inner surface of the cylinder unit 100 toward the inner side of the cylinder unit 100.

A guide groove portion 311 is formed in a recessed shape in an outer surface of the flange part 310 to correspond to the concave groove portion 120. The guide member 600 is arranged between the concave groove portion 120 and the guide groove portion 311, and the flange part 310 linearly moves along the guide member 600.

Figure 4:
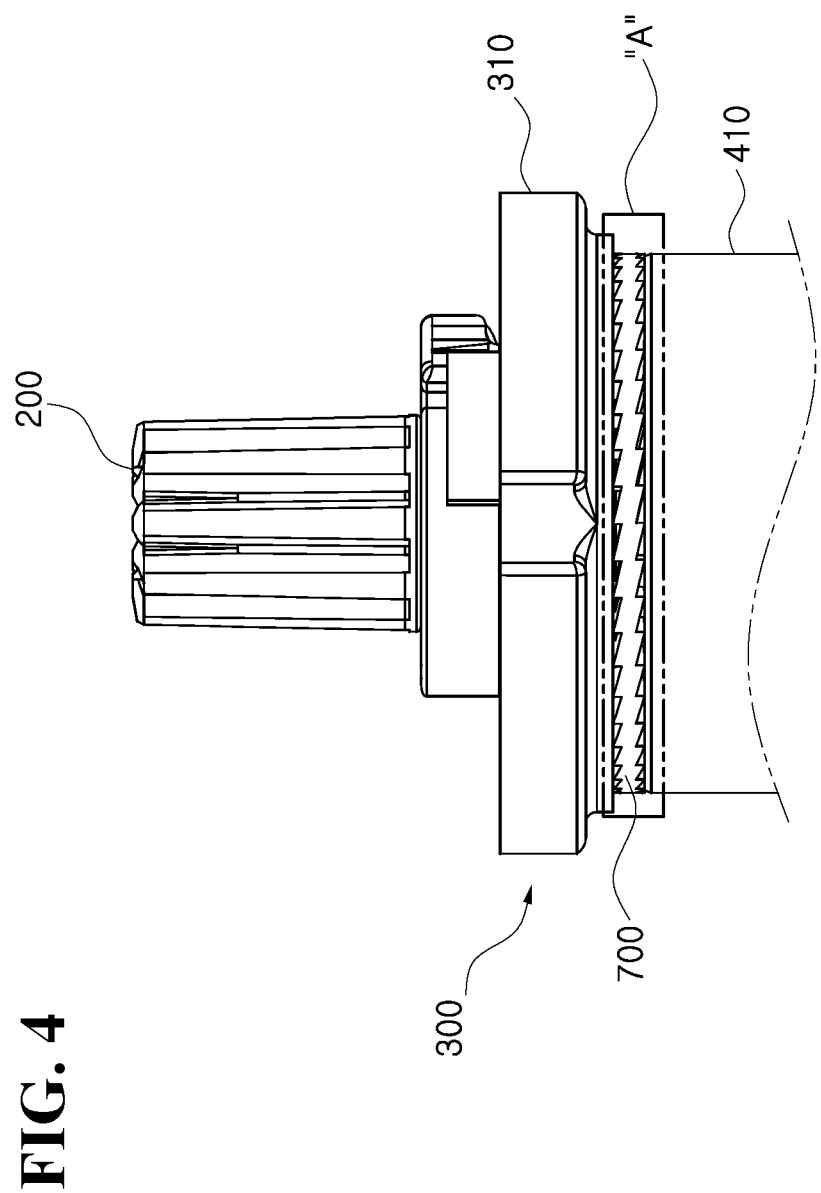
FIG. 4 is a view illustrating a washer unit in the electronic brake device of the vehicle according to the embodiment of the present disclosure.
Figure 5:
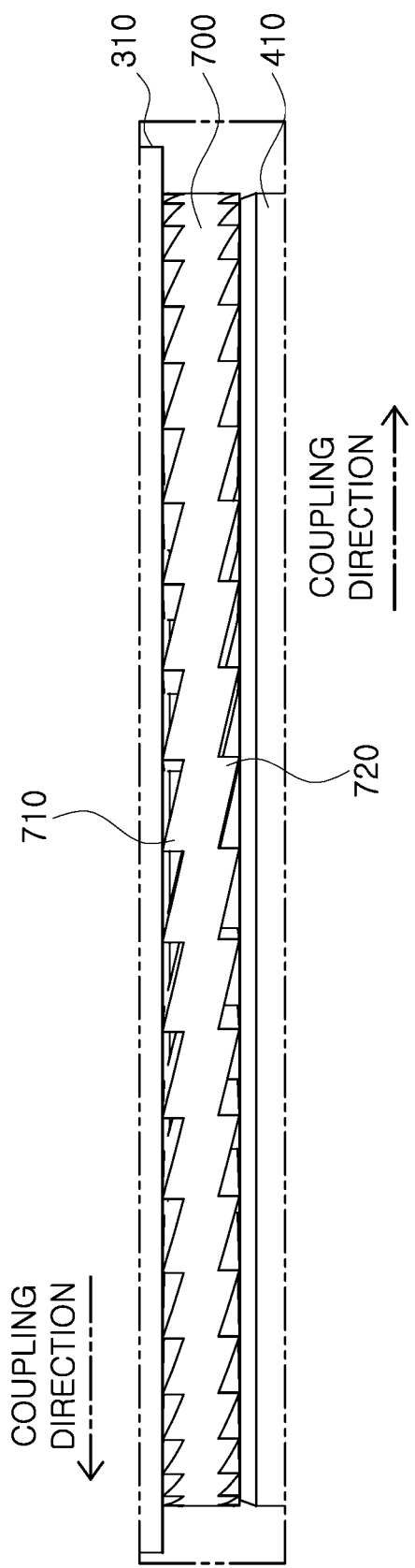
FIG. 5 is an enlarged view of portion A in the FIG. 4.

FIG. 4 is a view illustrating a washer unit in the electronic brake device of the vehicle according to the embodiment of the present disclosure, and FIG. 5 is an enlarged view illustrating portion A in the FIG. 4.

Referring to FIGS. 2, 4, and 5, the electronic brake device of the vehicle according to the embodiment of the present disclosure may include the washer unit 700.

The washer unit 700 is formed in a ring shape and mounted between the nut unit 300 and the piston unit 400. To describe additionally, the washer unit 700 prevents uncoupling of the nut unit 300 and the rod part 410, which are spirally coupled to each other, in a direction opposite to a coupling direction.

That is, uncoupling between the nut unit 300 and the piston unit 400 may be prevented when moving directions are changed. The nut unit 300 performs a linear reciprocating motion in an axial direction of the screw shaft 200 according to a forward/backward rotation direction of the screw shaft 200, and the piston unit 400, in conjunction with the nut unit 300, performs a linear reciprocating motion inside the cylinder unit 100.

The washer unit 700 may include a first thread 710 and a second thread 720.

The first thread 710 is provided on one outer side surface (upper side in FIG. 5) of the washer unit 700 and is formed in the circumferential direction of the washer unit 700. The first thread 710 is formed in a shape of a right-angled triangle with a hypotenuse inclined in a direction in which the nut unit 300 and the rod part 410 are coupled.

The second thread 720 is provided on the other outer side surface (lower side in FIG. 5) and is formed in the circumferential direction of the washer unit 700. The second thread 720 is formed in a shape of a right-angled triangle with a hypotenuse inclined in a direction in which the nut unit 300 and the rod part 410 are coupled.

The hypotenuses formed on each of the first thread 710 and the second thread 720 are inclined in a direction in which the nut unit 300 and the piston unit 400 are coupled to prevent over-torque from being applied when the nut unit 300 and the piston unit 400 are spirally coupled to each other.

While the washer unit 700 is mounted between the nut unit 300 and the piston unit 400, when the nut unit 300 and the piston unit 400 are rotated in opposite directions and the nut unit 300 and the piston unit 400 are spirally coupled to each other, an apex area of the first thread 710 that is in contact with the nut unit 300 is pressed and deformed, and at the same time, an apex area of the second thread 720 that is in contact with the rod part 410 is pressed and deformed.

Because each apex area of the first thread 710 and the second thread 720 is deformed when the nut unit 300 and the piston unit 400 are spirally coupled to each other, when the moving direction of the nut unit 300 and the piston unit 400 is changed and torque is applied in a direction opposite to a coupling direction, stress is concentrated in the apex areas of the first thread 710 and the second thread 720, and thus frictional resistance increases.

Therefore, due to the increased frictional resistance, uncoupling between the nut unit 300 and the piston unit 400 is prevented, and the double-acting hydraulic pressure in the cylinder unit 100 may be formed with the anti-loosening structure.

A process of operating the electronic brake device of the vehicle, which is formed with the described structure according to the embodiment of the present disclosure, will be described as follows.

Figure 6:
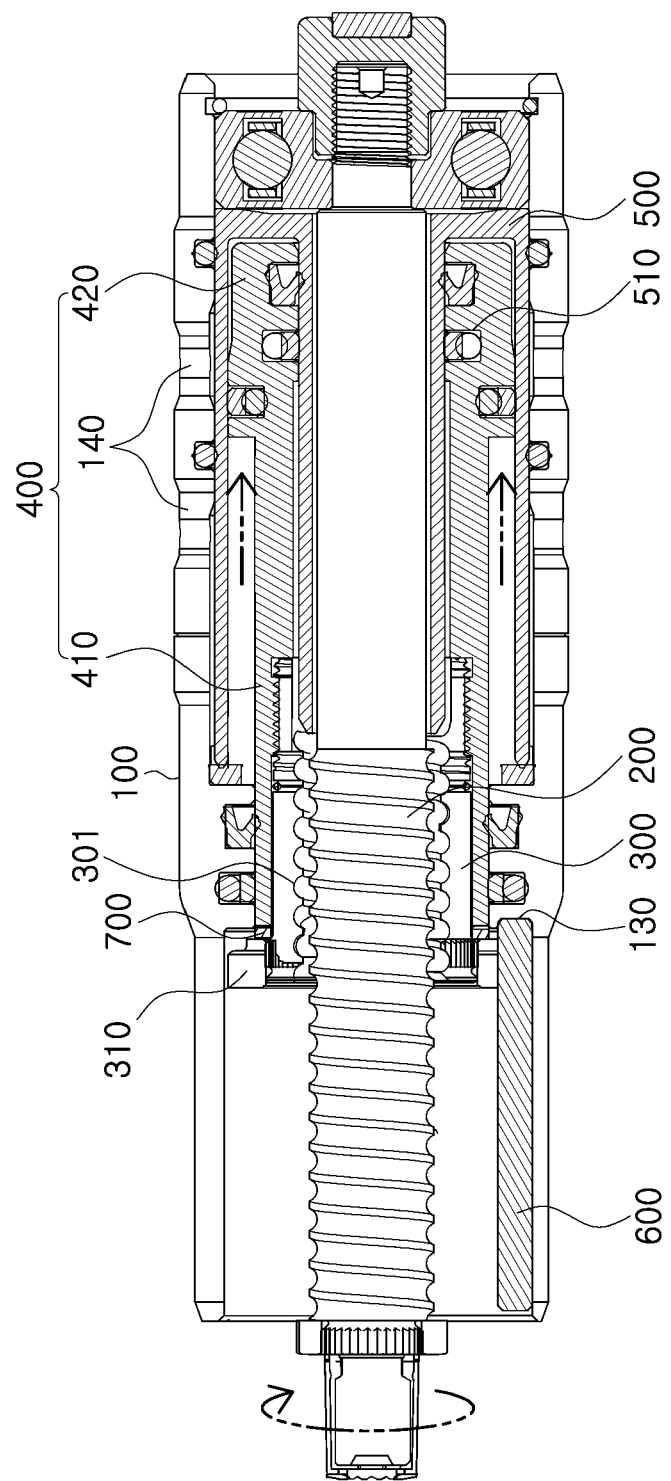
FIG. 6 is a cross-sectional view illustrating an operating state in which a piston unit moves forward in a cylinder unit in the electronic brake device of the vehicle according to the embodiment of the present disclosure.

FIG. 6 is a cross-sectional view illustrating an operating state in which the piston unit moves forward in the cylinder unit in the electronic brake device of the vehicle according to the embodiment of the present disclosure.

Referring to FIG. 6, when the screw shaft 200, which is coupled to the motor M and receives a rotational force from the motor M, performs a unidirectional axis rotation in the cylinder unit 100, the nut unit 300 moves along the screw shaft 200 toward the sleeve unit 500.

In this case, a unidirectional rotation of the flange part 310 integrally formed with the nut unit 300 is restricted by the guide member 600 disposed within the cylinder unit 100, and the movement of the flange part 310 is guided by the guide member 600. Thus, the nut unit 300 linearly moves in an axial direction of the screw shaft 200 without rotation.

In addition, the guide member 600 is formed to be long with a predetermined length in a lengthwise direction of the cylinder unit 100, and thus the stroke required for forming a braking hydraulic pressure can be secured longer compared to the same layout.

Meanwhile, when the nut unit 300 moves toward the sleeve unit 500, the piston unit 400 coupled to the nut unit 300 linearly moves forward inside the cylinder unit 100 in conjunction with the nut unit 300 and then forms the braking hydraulic pressure.

Figure 7:
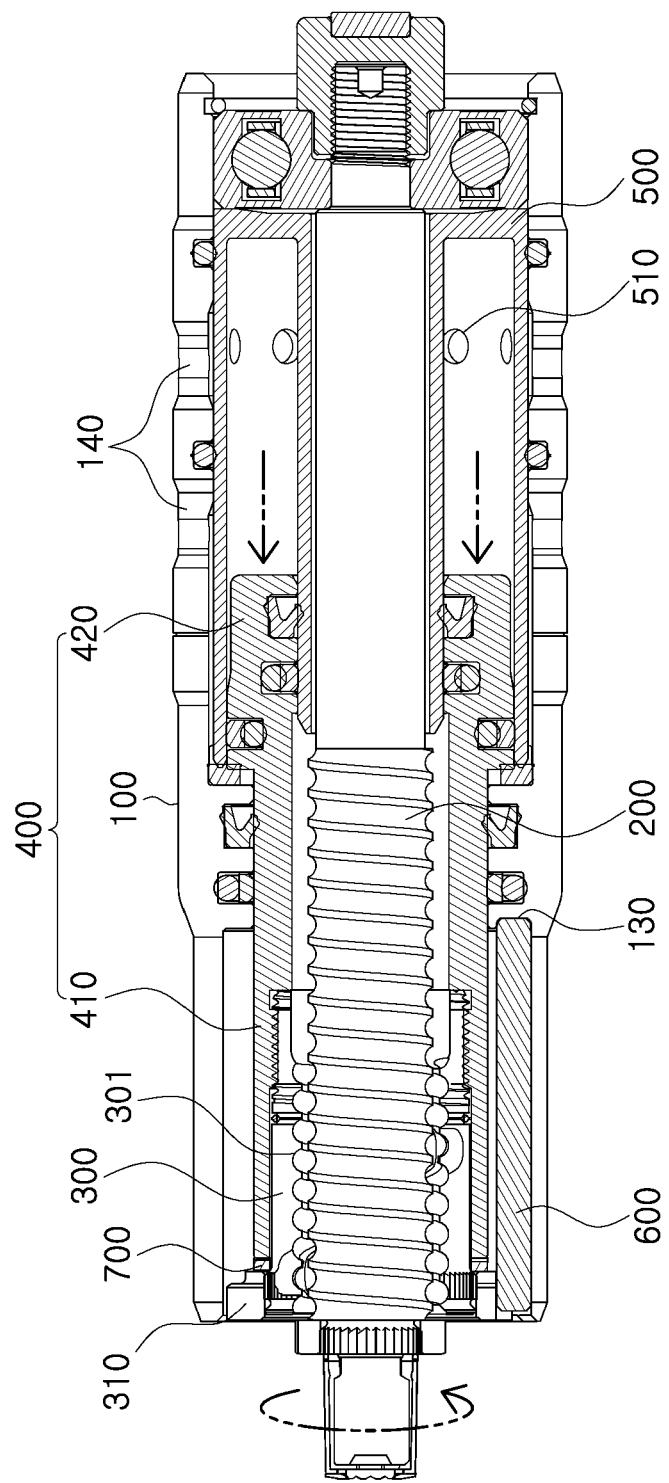
FIG. 7 is a cross-sectional view illustrating an operating state in which the piston unit moves backward in the cylinder unit in the electronic brake device of the vehicle according to the embodiment of the present disclosure.

FIG. 7 is a cross-sectional view illustrating an operating state in which the piston unit moves backward in the cylinder unit in the electronic brake device of the vehicle according to the embodiment of the present disclosure.

Referring to FIG. 7, when the screw shaft 200, which performed a unidirectional axis rotation in the cylinder unit 100, axis-rotates in a reverse direction, the nut unit 300 moves along the screw shaft 200 in a direction opposite to the sleeve unit 500.

In this case, the reverse rotation of the flange part 310 integrally formed with the nut unit 300 is restricted provided inside the cylinder unit 100, and the flange part 310 is guided by the guide member 600. Thus, the nut unit 300 linearly moves in an axial direction of the screw shaft 200 without rotation.

In addition, the guide member 600 is formed to be long with a predetermined length in a lengthwise direction of the cylinder unit 100, and thus the stroke required for forming a braking hydraulic pressure can be secured longer than the same layout.

Meanwhile, when the nut unit 300 moves in a direction opposite to the sleeve unit 500, the piston unit 400 coupled to the nut unit 300 linearly moves backward inside the cylinder unit 100 in conjunction with the nut unit 300 and then forms the braking hydraulic pressure. The piston unit 400 linearly moves backward inside the cylinder unit 100, and thus the double-acting hydraulic pressure is formed.

The electronic brake device of the vehicle according to the embodiment of the present disclosure may convert the rotary motion of the screw shaft 200 into the linear motion of the piston unit 400 with a configuration of the guide member 600 that is mounted inside the cylinder unit 100 to restrict rotation of the nut unit 300 moving along the screw shaft 200 and to guide linear moving of the nut unit 300. Thus, cost reduction and performance improvement in noise, vibration, and harshness (NVH) can be achieved.

In the electronic brake device of the vehicle according to the embodiment of the present disclosure, the rotation of the flange part 310 is restricted by the guide member 600, and the flange part 310 linearly moving along the guide member 600 is integrally formed with the nut unit 300. Therefore, the device can increase rigidity and reduce assembly complexity thereof.

In the electronic brake device of the vehicle according to the embodiment of the present disclosure, the washer unit 700 on which threads are formed is mounted between the nut unit 300 and the piston unit 400. Therefore, uncoupling between the nut unit 300 and the piston unit 400 can be prevented.

The present disclosure has been described with reference to exemplary embodiments illustrated in the accompanying drawings, but this is only for exemplary purposes, and those skilled in the art will appreciate that various modifications and other equivalent exemplary embodiments are possible. Thus, the true technical scope of the disclosure should be defined by the following claims.

What is claimed is:

1. An electronic brake of a vehicle, comprising:
   a cylinder unit;
   a screw shaft disposed at a cylinder unit and configured to be rotated by a rotational force received from a motor;
   a nut unit coupled to the screw shaft with a ball member interposed therebetween, configured to reciprocate in an axial direction of the screw shaft when the screw shaft rotates, and having a first side end portion at which a flange part is disposed;
   a piston unit coupled to the nut unit and configured to move in conjunction with the nut unit;
   a sleeve unit disposed within the cylinder unit and configured to guide the piston unit to move within the cylinder unit;
   a guide member disposed within the cylinder unit and configured to guide movement of the flange part, wherein the guide member is configured to restrict rotation of the flange part, which restricts rotation of the nut unit;
   a port disposed at an outer surface of the cylinder unit and configured to permit movement of hydraulic fluid moved by the piston in the cylinder unit through the port; and
   a cutoff hole part disposed at the outer surface of the sleeve unit and connected to the port.

2. The electronic brake of claim 1, further comprising a concave groove portion disposed at an inner surface of the cylinder unit and recessed in a lengthwise direction of the cylinder unit, wherein the guide member is disposed at the concave groove portion.

3. The electronic brake of claim 2, further comprising a support portion disposed at the inner surface of the cylinder unit, protruding from a side end portion of the concave groove portion, and configured to support a side end portion of the guide member.

4. The electronic brake of claim 2, wherein:
   the nut unit comprises a guide groove portion recessed in an outer surface of the flange part and disposed corresponding to the concave groove portion, and
   the flange part is configured to move in the nut unit along the guide member.

5. The electronic brake of claim 1, wherein the piston unit comprises:
   a rod part spirally coupled to an outer surface of the nut unit; and
   a head part integrally formed with the rod part and configured to reciprocate in the sleeve unit in a lengthwise direction of the sleeve unit.

6. The electronic brake of claim 1, wherein the nut unit and the flange part are integrally formed with each other.

7. The electronic brake of claim 1, wherein the cylinder unit is configured to generate a double-acting hydraulic pressure according to reciprocating movement of the piston unit.

8. An electronic brake of a vehicle, comprising:
   a cylinder unit;
   a screw shaft disposed at a cylinder unit and configured to be rotated by a rotational force received from a motor;
   a nut unit coupled to the screw shaft with a ball member interposed therebetween, configured to reciprocate in an axial direction of the screw shaft when the screw shaft rotates, and having a first side end portion at which a flange part is disposed;

a piston unit coupled to the nut unit and configured to move in conjunction with the nut unit;

a sleeve unit disposed within the cylinder unit and configured to guide the piston unit to move within the cylinder unit; and a guide member disposed within the cylinder unit and configured to guide movement of the flange part, wherein the guide member is configured to restrict rotation of the flange part, which restricts rotation of the nut unit, further comprising a washer unit disposed between the nut unit and the piston unit.

9. The electronic brake of claim 8, wherein the washer unit comprises:

a first thread disposed at a first outer side surface of the washer unit and formed in a circumferential direction of the washer unit, and a second thread disposed at a second outer side surface of the washer unit and formed in the circumferential direction of the washer unit.

10. The electronic brake of claim 9, wherein the first thread and the second thread have a triangle shape.

\* \* \* \* \*